(12) United States Patent
Li et al.

(10) Patent No.: US 9,151,370 B2
(45) Date of Patent: Oct. 6, 2015

(54) ANGLE ADJUSTING MECHANISM

(71) Applicants: Bing Li, Shenzhen (CN); Yong Zhang, Shenzhen (CN); Bo Yang, Shenzhen (CN)

(72) Inventors: Bing Li, Shenzhen (CN); Yong Zhang, Shenzhen (CN); Bo Yang, Shenzhen (CN)

(73) Assignee: HONG FU JIN PRECISION INDUSTRY CO., LTD., New Taipei (TW)

( * ) Notice: Subject to any disclaimer, the term of this patent is extended or adjusted under 35 U.S.C. 154(b) by 376 days.

(21) Appl. No.: 13/648,423

(22) Filed: Oct. 10, 2012

(65) Prior Publication Data

US 2013/0160584 A1 Jun. 27, 2013

(30) Foreign Application Priority Data

Dec. 21, 2011 (CN) .............................. 201110432410

(51) Int. Cl.
*F16H 19/08* (2006.01)
*F16H 25/18* (2006.01)
*F16H 25/20* (2006.01)

(52) U.S. Cl.
CPC .............. *F16H 25/186* (2013.01); *F16H 25/20* (2013.01); *F16H 2025/204* (2013.01); *F16H 2025/2075* (2013.01); *Y10T 74/18656* (2015.01)

(58) Field of Classification Search
CPC .............. F16H 25/20; F16H 2025/204; F16H 2025/2075; F16H 25/186

USPC .................... 74/56, 57, 58, 427.71, 89, 89.23
See application file for complete search history.

(56) References Cited

U.S. PATENT DOCUMENTS

| | | | | |
|---|---|---|---|---|
| 2,398,607 A | * | 4/1946 | Weingart | ........................... 74/89 |
| 2,818,743 A | * | 1/1958 | Zatsky | ............................. 74/393 |
| 2,883,183 A | * | 4/1959 | Finsterwalder et al. | ........... 49/26 |
| 3,731,546 A | * | 5/1973 | MacDonald | ........................ 74/63 |
| 4,073,167 A | * | 2/1978 | Bates, II | ........................ 70/133 |
| 4,666,124 A | * | 5/1987 | Giacobbi | ........................ 251/56 |
| 4,760,907 A | * | 8/1988 | Avny | ............................. 192/141 |
| 4,914,967 A | * | 4/1990 | Proulx et al. | ....................... 74/57 |
| 5,025,914 A | | 6/1991 | Narushima | |
| 5,328,152 A | * | 7/1994 | Castle | ............................. 251/229 |
| 5,967,008 A | | 10/1999 | Daniels | |
| 2010/0254831 A1 | * | 10/2010 | Bristow | ........................ 417/374 |

FOREIGN PATENT DOCUMENTS

TW M381475 6/2010

* cited by examiner

*Primary Examiner* — David M Fenstermacher
(74) *Attorney, Agent, or Firm* — Novak Druce Connolly Bove + Quigg LLP

(57) ABSTRACT

An angle adjusting mechanism includes a base seat, a driving assembly, a guiding assembly and an adjusting member. The driving assembly is mounted on the base seat. The driving assembly includes a driving member, a screw rod rotated by the driving member and a screw nut sleeved on the screw rod. The driving member is mounted on the base seat. The screw nut engages with the screw rod and is capable of moving along an axial direction of the screw rod. The guiding assembly is mounted on the base seat and guides the screw nut. The adjusting member is sleeved on the guiding assembly and rotated by the screw nut to a predetermined angle.

14 Claims, 5 Drawing Sheets

ANGLE ADJUSTING MECHANISM

BACKGROUND

1. Technical Field

The present disclosure relates to adjusting mechanisms, and more particularly, to an angle adjusting mechanism.

2. Description of Related Art

In industrial area, two workpieces are commonly combined with each other. An angle adjusting mechanism may be employed here to adjust the two workpieces before combining them. When working, the angle adjusting mechanism rotates a workpiece and aligns the workpiece to the other workpiece. The angle adjusting mechanism includes a driving member, a reducer and an output shaft located at an end of the reducer. The driving member drives the output shaft to rotate via the reducer, and then the output shaft rotates the workpiece. The reducer includes a plurality of gears engaging with each other in order. However, the adjusting mechanism transfers torsion to the output shaft via the plurality of gears. The transmission accuracy may be low due to engaging clearances between the gears. In addition, a relative greater torsion loss may occur in the transmission process because of the plurality of gears.

Therefore, there is room for improvement in the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
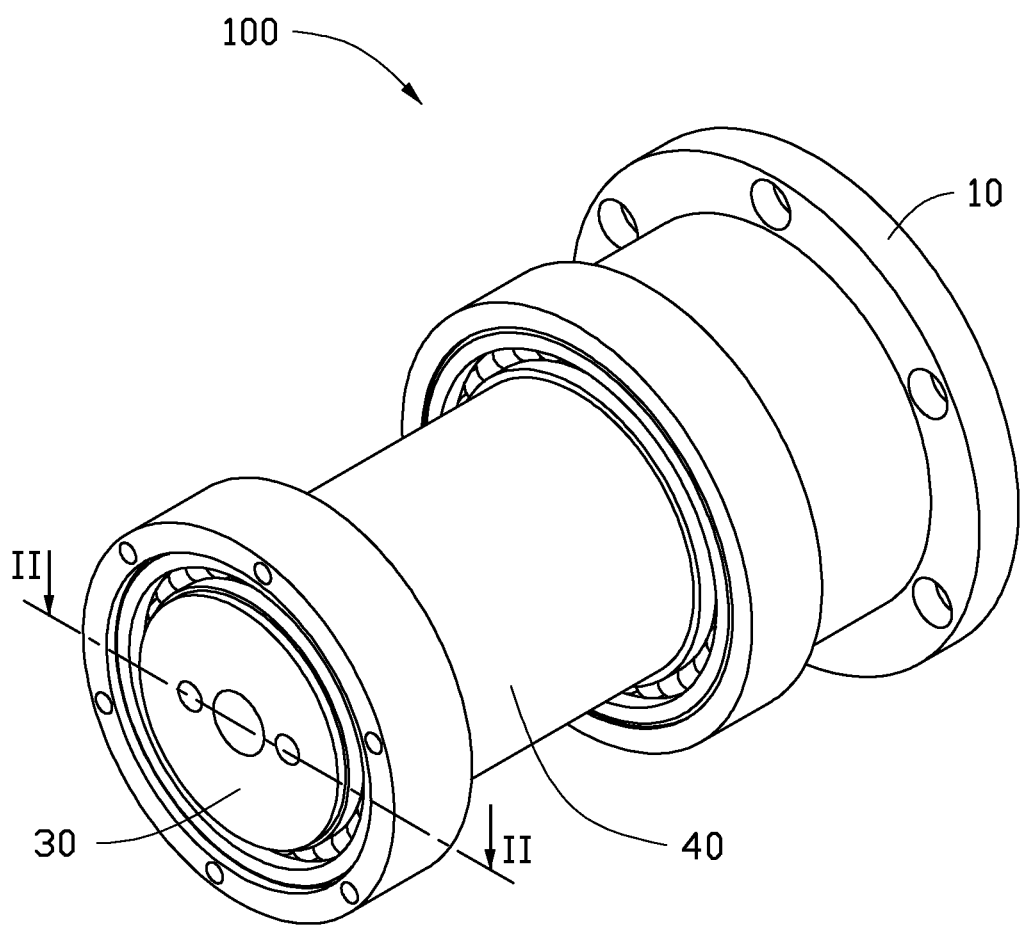
FIG. 1 is an assembled, isometric view of an embodiment of an angle adjusting mechanism.
Figure 2:
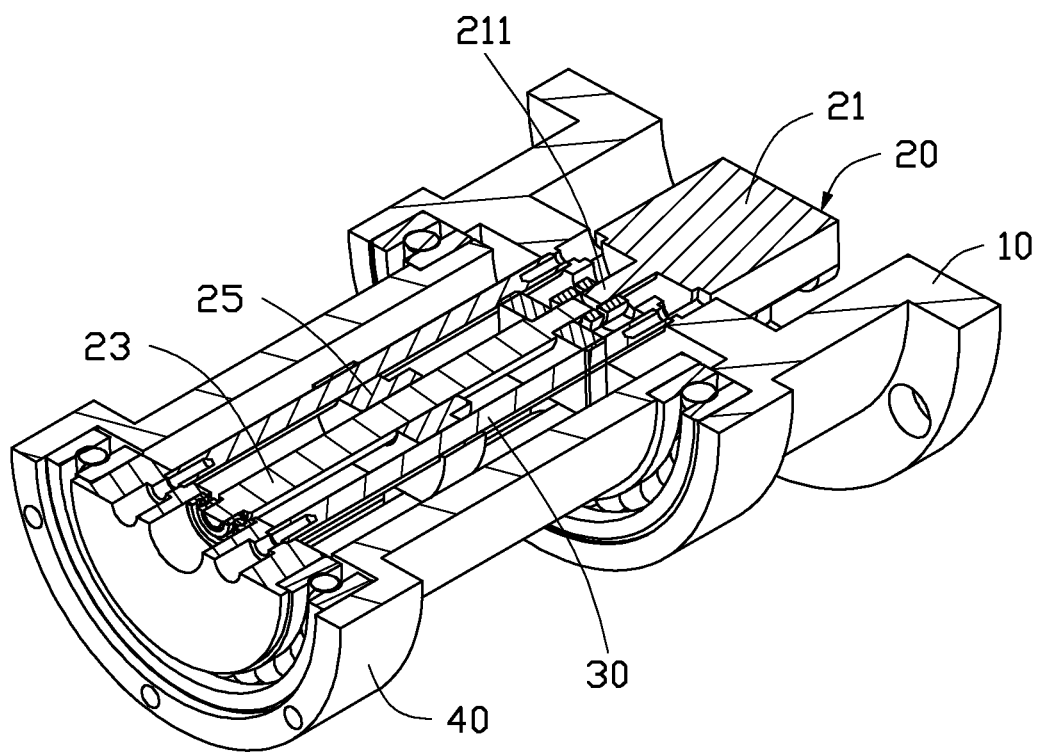
FIG. 2 is a cross-sectional view of the angle adjusting mechanism of FIG. 1, taken along line II-II.

FIGS. 1 and 2 show an embodiment of an angle adjusting mechanism 100. The angle adjusting mechanism 100 includes a base seat 10, a driving assembly 20, a guiding assembly 30 and an adjusting member 40. The driving assembly 20 is mounted on the base seat 10. The guiding assembly 30 is sleeved on the driving assembly 20 and connected to the base seat 10. The adjusting assembly 40 is sleeved on the guiding assembly 30 and driven by the driving assembly 20. The adjusting assembly 40 is guided by the guiding assembly 30, such that the adjusting assembly 40 is capable of rotating to a predetermined angle with a high accuracy.

Figure 3:
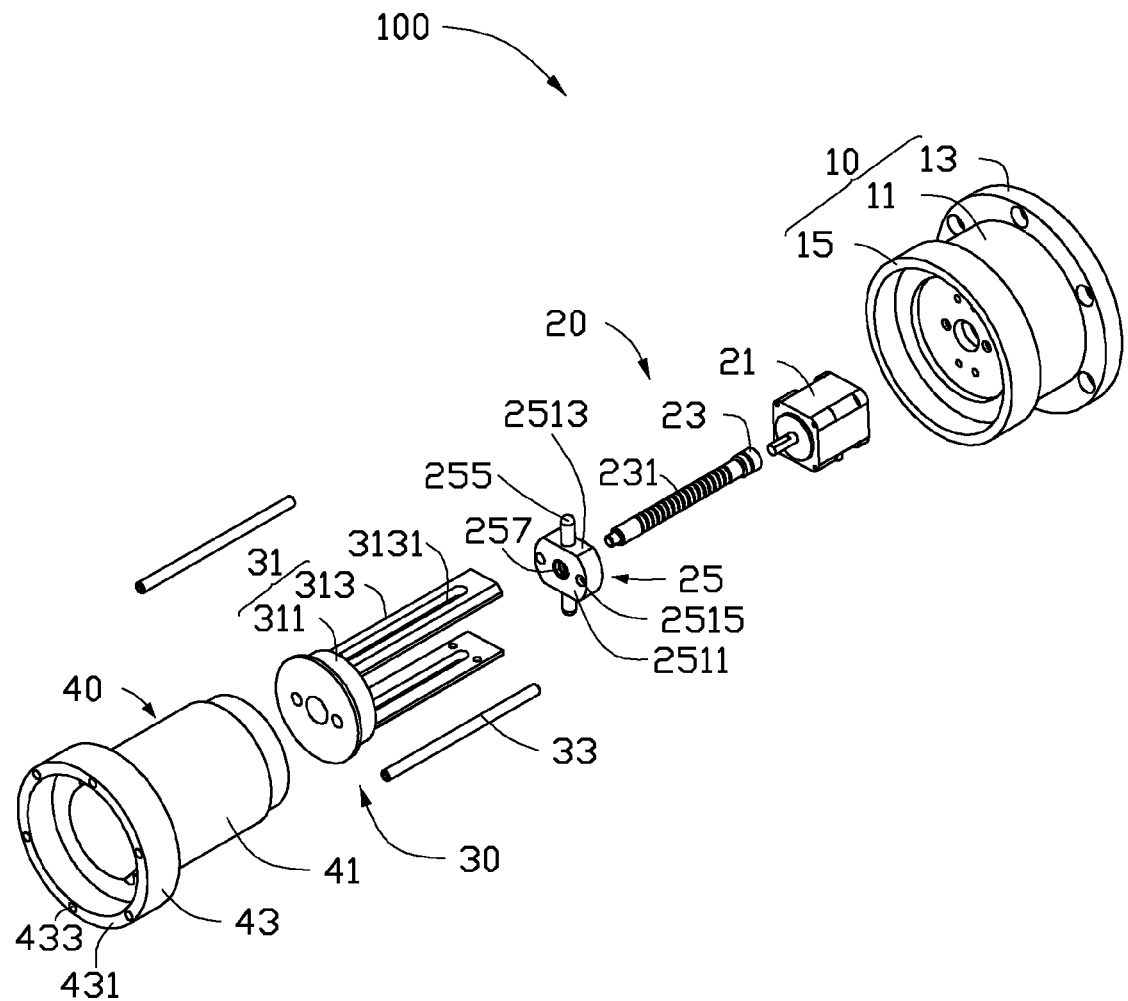
FIG. 3 is an exploded, isometric view of the angle adjusting mechanism of FIG. 1.

Referring to FIG. 3, the base seat 10 is substantially a stepped cylindrical shape, includes a main body 11, a fixing portion 13 and a supporting portion 15. The main body 11 is a cylindrical shell shape. The fixing portion 13 and the supporting portion 15 are located at opposite ends of the main body 11. The fixing portion 13 is in an annular shell shape, and perpendicularly extends outwardly along a radial direction of the main body 11. The supporting portion 15 is in a bowl shape, firstly extends outward along a radial direction of the main body 11, and then extends along an axial direction of the main body 11 away from the fixing portion 13.

Figure 4:
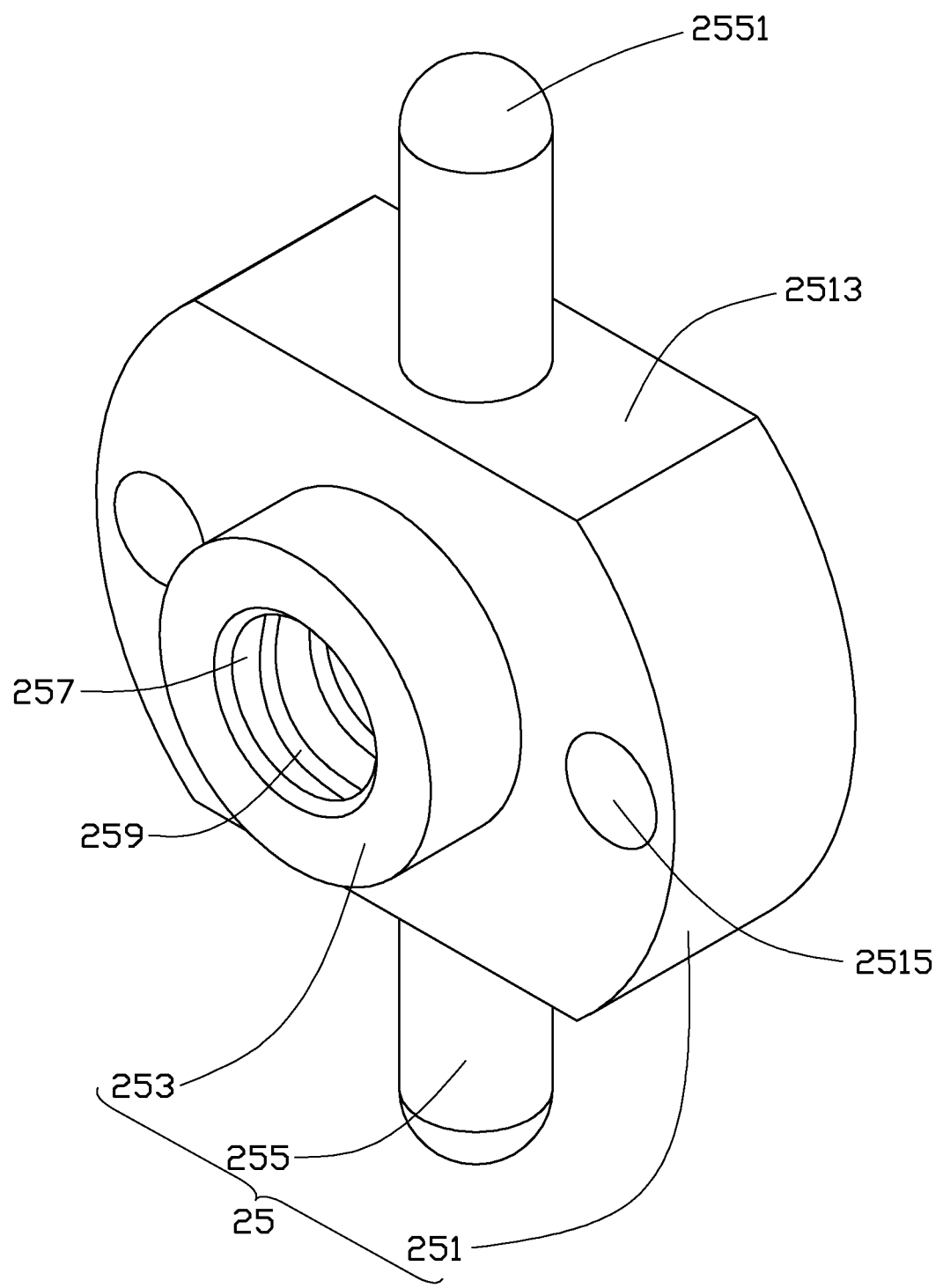
FIG. 4 is an isometric view of a screw nut of the angle adjusting mechanism of FIG. 1.

Referring to FIGS. 3 and 4, the driving assembly 20 includes a driving member 21, a screw rod 23 and a screw nut 25. The driving member 21 is mounted in the fixing portion 13 with an output shaft 211 extending into the supporting portion 15. The screw rod 23 is mounted on the driving member 21 and capable of being driven to rotate by the driving member 21. The screw rod 23 includes a first screw portion 231 on a periphery along an axial direction. The screw nut 25 is sleeved on the screw rod 23 and engages with the first screw portion 231. In the embodiment, the driving member 21 is a motor.

The screw nut 25 includes a base body 251, a sleeving portion 253 extending from an end of the base body 251 and a pair of sliding posts 255 extending from opposite sides of the base body 251. The base body 251 defines a pair of end surfaces 2511 and a pair of cutting surfaces 2513. The pair of end surfaces 2511 are positioned on opposite ends of the base body 251, the pair of cutting surfaces 2513 are positioned at opposite sides of the base body 251. The pair of end surfaces 2511 is parallel to each other and both are planes. The pair of cutting surfaces 2513 are parallel to each other and both are planes. The base body 251 defines a pair of guiding holes 2515 passing through the pair of end surfaces 2511. The sleeving portion 253 is positioned on one end surface 2511, the pair of guiding holes 2515 are located at two sides of the sleeving portion 253. The pair of sliding posts 255 perpendicularly extends from the pair of cutting surfaces 2513 respectively. Each sliding post 255 includes a sliding end 2551 away from the cutting surface 2513. The screw nut 25 further defines a sleeving hole 257 passing through the base body 251 and the sleeving portion 253, forming a second screw portion 259 at an inner surface of the sleeving hole 257. The sleeving hole 257 is parallel to the pair of guiding holes 2515.

The guiding assembly 30 is sleeved on the driving assembly 20. The guiding assembly 30 includes a guiding bracket 31 and a pair of guiding members 33. The guiding bracket 31 is mounted on the supporting portion 15 of the base seat 10. The guiding bracket 31 includes a fixing plate 311 and a pair of guiding portions 313 extending from the fixing plate 311 towards the base seat 10. The fixing plate 311 is a round plate and rotatably sleeved on an end of the screw rod 23 away from the base seat 10. The pair of guiding portions 313 is parallel to each other and fixed to the supporting portion 15. Each guiding portion 313 is in a strip shape, and defines a guiding groove 3131 extending along a length of the guiding portion 313. The pair of sliding posts 255 of the screw nut 25 passes through the corresponding guiding groove 2515. The pair of guiding members 33 is parallel to each other. Each guiding member 33 is fixed to the fixing plate 311 and supporting portion 15 with opposite ends. The pair of guiding members 33 respectively extends through the pair of guiding holes 2515 of the screw nut 25.

Figure 5:
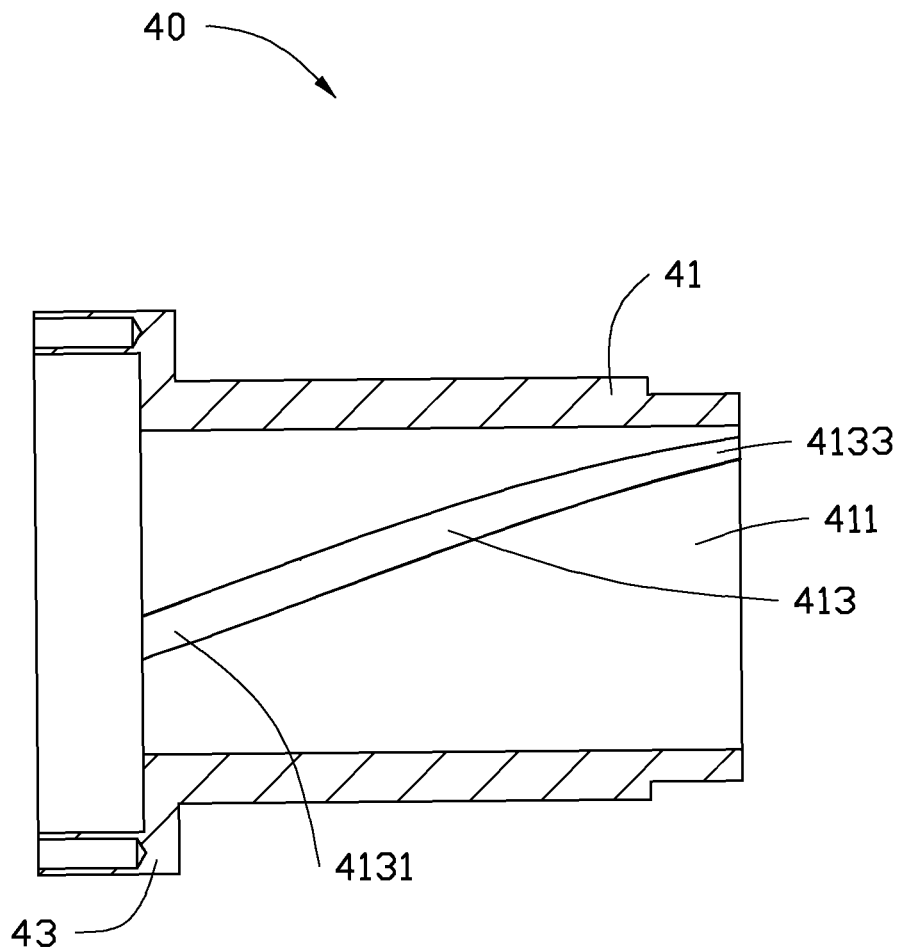
FIG. 5 is a cross-section view of an adjusting member of the angle adjusting mechanism of FIG. 1.

Referring to FIG. 5, the adjusting member 40 is substantially a cylindrical shell and sleeved on the screw nut 25. The adjusting member 40 includes a transmission portion 41 and an output portion 43 connected to an end of the transmission portion 41. An end of the transmission portion 41 is rotatably received in the supporting portion 15 of the base seat 10. The output portion 43 is rotatably sleeved on the fixing plate 311 of the guiding bracket 31. The transmission portion 41 includes an inner sidewall 411 and defines a pair of sliding grooves 413 on the inner side wall 411. The pair of sliding grooves 413 is opposite to each other. The pair of sliding posts 255 is partially received in the pair of sliding grooves 413 respectively. The sliding groove 413 includes a first end 4131 and a second end 4133 at opposite ends of the transmission portion 41. The first end 4131 is adjacent to the output portion 431 and smoothly connects with the second end 4133. The first end 4131 and the second end 4133 cut through opposite ends of the transmission portion 41. The end projection of the transmission portion 41 is an annular ring. The end projection of the sliding groove 413 is an arc-line. A central angel of the annular ring subtended by the arc-line is about 60 degrees. A diameter of the output portion 43 is greater than that of the transmission portion 41. The output portion 43 defines an annular end surface 431 and a plurality of connecting holes 433 on the end surface 431. The end surface 431 is away from the transmission portion 41. In the embodiment, the plurality of connecting holes 433 are uniformly defined on the end surface 431.

Referring to FIGS. 1 through 5, when in assembly, the driving member 21 is mounted on the base seat 10. The screw rod 23 is connected to the driving member 21. The screw nut 25 is sleeved on the screw rod 23, and the first screw portion 231 engages with the second screw portion 259. The fixing plate 311 is rotatably sleeved on the screw rod 23, and the pair of guiding portions 313 is fixed to the base seat 10. The pair of guiding members 33 respectively extends through the pair of guiding holes 2515 of the screw nut 25. Opposite ends of the guiding member 33 are fixed to the fixing plate 311 and the base seat 10. The pair of sliding posts 255 extends through the pair of guiding grooves 3131 of the guiding bracket 31. The adjusting member 40 is sleeved on the guiding assembly 30 and rotatably connected to the base seat 10 and the fixing plate 311 with opposite ends. Each sliding end 2551 is received in one corresponding sliding groove 413, such that the assembling of the angle adjusting mechanism 100 is accomplished.

When in use, a workpiece is fixed to the output portion 43 via the plurality of connecting holes 433. The driving member 21 rotates the screw rod 23, such that the screw nut 25 moves toward to the base seat 10 along the screw rod 23. The pair of sliding posts 255 respectively slides in the pair of sliding guiding grooves 3131, and the pair of sliding ends 2551 respectively slides in the pair of sliding grooves 413. The pair of sliding ends 2551 drives the adjusting member 40 rotate. When the screw nut 25 moves from the first end 4131 to the second end 4133 of the sliding groove 413, the adjusting member 21 drives the workpiece to rotate 60 degrees. When the driving member 21 rotates the screw rod 23 along a reverse direction, the adjusting member 40 rotates the workpiece along an opposite direction.

The sliding groove 413 may be a guiding rib, and the sliding post 255 may define a sliding groove receiving a part of the guiding rib. The central angel of the projection of the transmission portion 41 subtended by the projection of the sliding groove may be changed in need. The number of the sliding grooves 413 may be changed, and the number of the sliding posts 255 should be changed accordingly.

When the sliding post 255 is tightly received in the guiding groove 3131, the guiding member 33 may be omitted. When the guiding member 33 has enough strength, the guiding portion 313 may be omitted.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. An angle adjusting mechanism, comprising:
a base seat;
a driving assembly mounted on the base seat, wherein the driving assembly comprises a driving member, a screw rod rotated by the driving member and a screw nut sleeved on the screw rod, the driving member is mounted on the base seat, the screw nut comprises a base body and a pair of sliding posts extending from opposite sides of the base body, the base body defines a pair of guiding holes passing through opposite ends of the base body, the base body engages with the screw rod and is capable of moving along an axial direction of the screw rod;
a guiding assembly mounted on the base seat and guiding the screw nut, wherein the guiding assembly comprises a guiding bracket and a pair of guiding members, the guiding bracket comprises a fixing plate and a pair of guiding portions extending from the fixing plate, the fixing plate is rotatably sleeved on an end of the screw rod away from the base seat, the pair of guiding portions are parallel to each other and fixed to the base seat, and the pair of guiding members are respectively extending through the pair of guiding holes and connected to the base seat; and
an adjusting member sleeved on the guiding assembly, defining a pair of sliding grooves opposite to each other in an inner side wall thereof for receiving the pair of sliding posts and rotated by the two sliding posts to a predetermined angle.

2. The angle adjusting mechanism of claim 1, wherein the adjusting member is substantially a cylindrical shell, the adjusting member comprises a transmission portion and an output portion connected to an end of the transmission portion, a diameter of the output portion is greater than that of the transmission portion, an end of the transmission portion away from the output portion is rotatably mounted on the base seat, the transmission portion comprises the inner sidewall and defines the two sliding grooves on the inner side wall, and each sliding post of the screw nut is partially received in one of the pair of sliding grooves.

3. The angle adjusting mechanism of claim 2, wherein an end projection of the transmission portion is an annular ring, an end projection of the sliding groove is an arc-line, and a central angel of the annular ring subtended by the arc-line is about 60 degrees.

4. The angle adjusting mechanism of claim 2, wherein each sliding groove comprises a first end and a second end opposite to the first end, the first end is adjacent to the output portion and smoothly connects with the second end, the first end and the second end cut through opposite ends of the transmission portion.

5. The angle adjusting mechanism of claim 4, wherein the screw rod comprises a first screw portion on a periphery thereof along an axial direction, the screw nut further comprises a sleeving portion extending from an end of the base body and defines a sleeving hole cutting through the base body and the sleeving portion, the screw nut forms a second screw portion in the sleeving hole, the screw nut is sleeved on the screw rod via the sleeving hole, and the second screw portion engages with the first screw portion.

6. The angle adjusting mechanism of claim 5, wherein the base body defines a pair of end surfaces and a pair of cutting surfaces thereon, the pair of end surfaces are located on opposite ends of the base body and parallel to each other, the pair of cutting surfaces are located at opposite sides of the base body and parallel to each other, the sleeving portion perpendicularly extends from one end surface, and the pair of sliding posts respectively extend from the pair of cutting surfaces.

7. The angle adjusting mechanism of claim 1, wherein each of the guiding portions defines a guiding groove thereon extending along a length direction of the guiding portion, each sliding post of the screw nut comprises a sliding end, the pair of sliding posts respectively extend through the pair of guiding grooves, and the pair of sliding ends are respectively received in the pair of sliding grooves of the adjusting member.

8. An angle adjusting mechanism, comprising:
a base seat;
a driving assembly mounted on the base seat, wherein the driving assembly comprises a screw rod and a screw nut sleeved on the screw rod, the screw rod is rotatably mounted on the base seat, the screw nut comprises a base boy engaging with the screw rod and at least one sliding post extending form a side of the base body, the base body defines a pair of guiding holes passing through opposite ends of the base body, and the screw nut is capable of moving along an axial direction of the screw rod;
a guiding assembly fixed on the base seat and guiding the screw nut wherein the guiding assembly comprises a guiding bracket and a pair of guiding members fixed to the guiding bracket, the guiding bracket comprises a fixing plate and at least one guiding portion extending from the fixing plate, the fixing plate is rotatably sleeved on an end of the screw rod away from the base seat, the at least one guiding portion is parallel to each other and fixed to the base seat, and the pair of guiding members are respectively extending through the pair of guiding holes and connected to the base seat; and
an adjusting member sleeved on the guiding assembly, wherein the adjusting member is substantially cylindrical shell and defines at least one sliding groove in an inner side wall thereof for receiving the at least one sliding post, and the adjusting member is rotated by the screw nut to a predetermined angle.

9. The angle adjusting mechanism of claim 8, wherein the adjusting member comprises a transmission portion and an output portion connected to an end of the transmission portion, a diameter of the output portion is greater than that of the transmission portion, an end of the transmission portion away from the output portion is rotatably mounted on the base seat, and the at least one sliding groove is defined on an inner sidewall of the transmission portion.

10. The angle adjusting mechanism of claim 9, wherein an end projection of the transmission portion is an annular ring, an end projection of the sliding groove is an arc-line, a central angel of the annular ring subtended by the arc-line is about 60 degrees.

11. The angle adjusting mechanism of claim 9, wherein the at least one sliding groove comprises a pair of sliding grooves opposite to each other, each sliding groove comprises a first end and a second end opposite to the first end, the first end is adjacent to the output portion and smoothly connects with the second end, the first end and the second end cut through opposite ends of the transmission portion.

12. The angle adjusting mechanism of claim 9, wherein the screw rod comprises a first screw portion on a periphery thereof along an axial direction, the screw nut further comprises a sleeving portion extending from an end of the base body and defines a sleeving hole cutting through the base body and the sleeving portion, the screw nut forms a second screw portion in the sleeving hole, the screw nut is sleeved on the screw rod via the sleeving hole, and the second screw portion engages with the first screw portion.

13. The angle adjusting mechanism of claim 12, wherein the base body defines a pair of end surfaces and a pair of cutting surfaces thereon, the pair of end surfaces are located on opposite ends of the base body and parallel to each other, the pair of cutting surfaces are located at opposite sides of the base body and parallel to each other, the sleeving portion perpendicularly extends from one end surface, and the at least one sliding post comprises a pair of sliding posts respectively extending from the pair of cutting surfaces.

14. The angle adjusting mechanism of claim 13, wherein each guiding portion defines a guiding groove thereon extending along a length direction of the guiding portion, each sliding post of the screw nut comprises a sliding end, the pair of sliding posts respectively extend through the pair of guiding grooves, and the pair of sliding ends are respectively received in the pair of sliding grooves of the adjusting member.

* * * * *